UNITED STATES PATENT OFFICE.

SAMUEL A. GOODMAN, JR., OF JAMESTOWN, TEXAS.

IMPROVEMENT IN COMPOUNDS FOR FISH-BAITS.

Specification forming part of Letters Patent No. 135,113, dated January 21, 1873.

*To all whom it may concern:*

Be it known that I, SAMUEL ADAMS GOODMAN, Jr., of Jamestown, in the county of Smith and State of Texas, have invented a new and Improved Fishing Compound, of which the following is a specification:

My invention consists of a compound of the following substances as a mixture to be applied to the ordinary bait for fish, or to the net, by which the bait is rendered more tempting to the fish, and they will be attracted into the net.

Oil of anise, asafetida, cardamom-seed, either golden, yellow, or black root, and buzzard meat, all except the latter being in equal parts, and the root and cardamom-seed being powdered fine and mixed together in a vial, a small piece only of the buzzard meat (fresh) being put in; the whole being then shaken well together and allowed to stand about twenty-four hours, when it will be ready for use.

The mixture should be shaken well each time before using. It is used by dropping a few drops on the ordinary bait after being applied to the hook, or in case of fishing with nets it is dropped on the net.

If the mixture is to be preserved for any considerable length of time the buzzard meat may be omitted until the time of using, as it will not keep so well as the other ingredients.

The scientific name of the black-root, alluded to above, is *Leptandra;* that of the golden or yellow root is *Hydrastis Canadensis;* and the kind of buzzard used is the one known as the turkey-buzzard.

Having thus described my invention, I claim as new and desire to secure by Letters Patent—

A mixture or compound of the substances herein specified, substantially as described, and the combination of the same with the ordinary bait or with nets for fishing, as set forth.

SAMUEL ADAMS GOODMAN, JR.

Witnesses:
  SAML. SEASTRUCK,
  JAMES O'NEAL.